United States Patent [19]

Sontag et al.

[11] Patent Number: 5,005,979
[45] Date of Patent: Apr. 9, 1991

[54] OPTICAL POSITION DETECTION

[75] Inventors: Heinz Sontag, Friedrichshafen; Hartmut Elias, Meersburg, both of Fed. Rep. of Germany; Wolfgang Ludwig, Taegerwilen, Switzerland; Walter Fritzsch, Markdorf, Fed. Rep. of Germany; Wolfgang Eschner, Daisendorf, Fed. Rep. of Germany; Rainer Hundhausen, Immenstaad, Fed. Rep. of Germany; Harald Kratz, Tettnang, Fed. Rep. of Germany

[73] Assignee: Dornier GmbH, Friedrichshafen, Fed. Rep. of Germany

[21] Appl. No.: 387,623

[22] Filed: Jul. 31, 1989

[30] Foreign Application Priority Data

Jul. 30, 1988 [DE] Fed. Rep. of Germany ....... 3826067

[51] Int. Cl.$^5$ .......................... G01B 11/14; F21V 9/16
[52] U.S. Cl. .................................. 356/375; 250/458.1
[58] Field of Search ........................... 356/375, 1

[56] References Cited

U.S. PATENT DOCUMENTS 4,885,471 12/1989 Telfair et al. ................... 250/365

FOREIGN PATENT DOCUMENTS

3525518C2 10/1987 Fed. Rep. of Germany .
63-55406A 3/1988 Japan ................................ 356/375

Primary Examiner—F. L. Evans
Assistant Examiner—K. P. Hantis
Attorney, Agent, or Firm—Ralf H. Siegemund

[57] ABSTRACT

An apparatus for determining the position of an object comprises a light source positioned in relation to the object so that at least one collimated beam is issued from a particular positon on the object and bearing a fixed and definite geometric relationship to the sought position; a fluorescent foil or plate is positioned in relation to such object such that a particular spot is stimulated by that collimated beam which then provides the fluorescence; a plurality of fiber optics are arranged such that one end of each fiber optics is placed on a particular geometric pattern to receive radiation from the stimulated spot while the respective other end of each fiber optics is arranged in a similar but smaller scale geometric pattern as the first ends are and in relation to a detector that provides an electrical signal representing the position of the object.

4 Claims, 4 Drawing Sheets

OPTICAL POSITION DETECTION

BACKGROUND OF THE INVENTION

The present invention relates to an apparatus and equipment for fiber optically measuring the absolute position of objects, particularly within electromagnetically shielded and screened spaces and rooms.

Multidimensional, rapidly repeatable measurements of positions are usually carried out through suitable electronic techniques or optical techniques using appropriate cameras. All these efforts have in common that a part of the measuring electronic has to be placed in the vicinity of the object that is subject to the measurement, or there must be available a direct visual connection, i.e. the object must be in the line of sight of some equipment. In the case of highly sensitive measurements, including, for example, magnetic field measurements in the human brain under utilization of supra conductor sensors, there may be undersirable and even impermissable electro magnetic stray fields in the vicinity of the object or, for some reasons, on the basis of some screening or shielding a visual observation is not possible.

German Patent application No. 35 11 757 describes a device for measuring the position of a precision transducer being provided with a light source which is equipped with a fluorescent collector cooperating generally with light detectors. The flourescent device specifically has a collector surface that is oriented to that light source. Boundary lines of that collector surface are provided with solar cells which provide output signals to be utilized, in turn, by an appropriate evaluation electronic, by means of which ultimately the spot on the fluorescent when being iluminated is determined in relation to a coordinate system that is superimposed upon the collector surface. Here then, one evaluates the ratio between the solar cell currents on opposite situated boundary surfaces in relation to each other, to thereby determine the coordinate values.

DESCRIPTION OF THE INVENTION

It is an object of the present invention to provide a new and improved equipment to determine the position of an object under avoidance of electromagnetic stray fields that may happen in the immediate vicinity of the object that is subject to the measurement.

It is a particular object of the present invention to provide a new and improved equipment for fiber optically measuring the position of an object under utilization of light sources, flourescent screens, and structure that responds to and evaluates flourescent light generally.

In accordance with the preferred embodiment of the present invention it is suggested to arrange an end of a plurality of light conductive fibers in a periodic pattern in operative connection to a source that stimulates production of flourescent light. These light conductive fibers are run to an evaluating device and their respective other ends replicate the geometry delineated by the first ends and a high resolution detector is provided in relation to these second ends which analyzes the resulting distribution of radiation so as to establish a representation for the "center of gravity" of the ilumination as it effected the first ends of the fibers. The pattern of light as it appears at the second end duplicates the input pattern so that a position representation of the original stimulating source can be established. In order to obtain a three dimensional indication of position, one uses three beams which resemble a three-legged stool. The stimulating radiations from the different directions will, moreover, be differently amplitude modulated and the detector signal is correspondingly de-modulated in order to provide appropriate differentiation among the light from the three spots on the flourescent screen.

Further, in accordance with the invention there is a fiber optic position establishing structure which includes a fiber optical conductor through which stimulating light is transmitted to the object and from there it is reflected via a suitable optic that produces a collimated beam. Alternatively, a suitable lamp or a laser is fixed directly to the measuring object, issuing a collimated light beam directly.

It is now decisive that the three beams of collimated light that directly or indirectly leave the object bears a direct three dimensional position relation thereto. In all cases the collimated beam is intercepted by a sufficiently large flourescent foil or flourescent plate to stimulate the foiling or plate to issue and transmit flourescent light. That light propagates towards the edges or borders of the coil or plate. As stated, light conductor fibers have one end each arranged in a periodic or regular pattern along the edge of the foil or plate and recieve the flourescent light. These light conductor fibers have their other ends arranged in a similar geometry in terms of congruence but delineating that bonding usually in a smaller scale. The resulting light distribution emanating from these fibers ends reaches a suitable position sensitive detector. Such a detector which is, for example, a lateral effect photo diode, or a suitable line detector or array detector, furnishes, broadly speaking, an output signal that is proportional to the location of the "center of gravity" of the illumination and that, in turn, is directly an indication and representation of the point of interest.

Owing to the utilization of light conductive fibers one can cover a rather large area for measurements, and input (the florescent foil/plate) under utilization of a relatively small detector delineating a geometrically analogous are or foil. Upon utilization, particularly, of three non-colinear stimulating radiations and measuring the stimulating point in two dimensions, one can determine the position and the location of the measuring object in three dimension. Owing to the fiber optic and back and forth transmission through the measuring and evaluating may actually be separated or apart by several kilometers.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawings, FIG. 1 illustrates basically an experimental set up for a stimulating beam and for measuring the position of an object in one particular dimension. Light from a stimulating laser beam source 7 is received by and coupled into one end of a light wave conductor or fiber optic 6 and is run to the measuring object 4. Here then through a particular arrangement, including a collimating lens 8, which produces a collimated beam, that beam is directed towards a stimulating spot 12, on a flourescent foil 2. The conductor 6 just provides for the requisite coupling of light to the object 4. It is the position of collimator 8 that is measured, along an axis X. The collimated beam may be exactly at right angles to foil 2.

Figure 1:
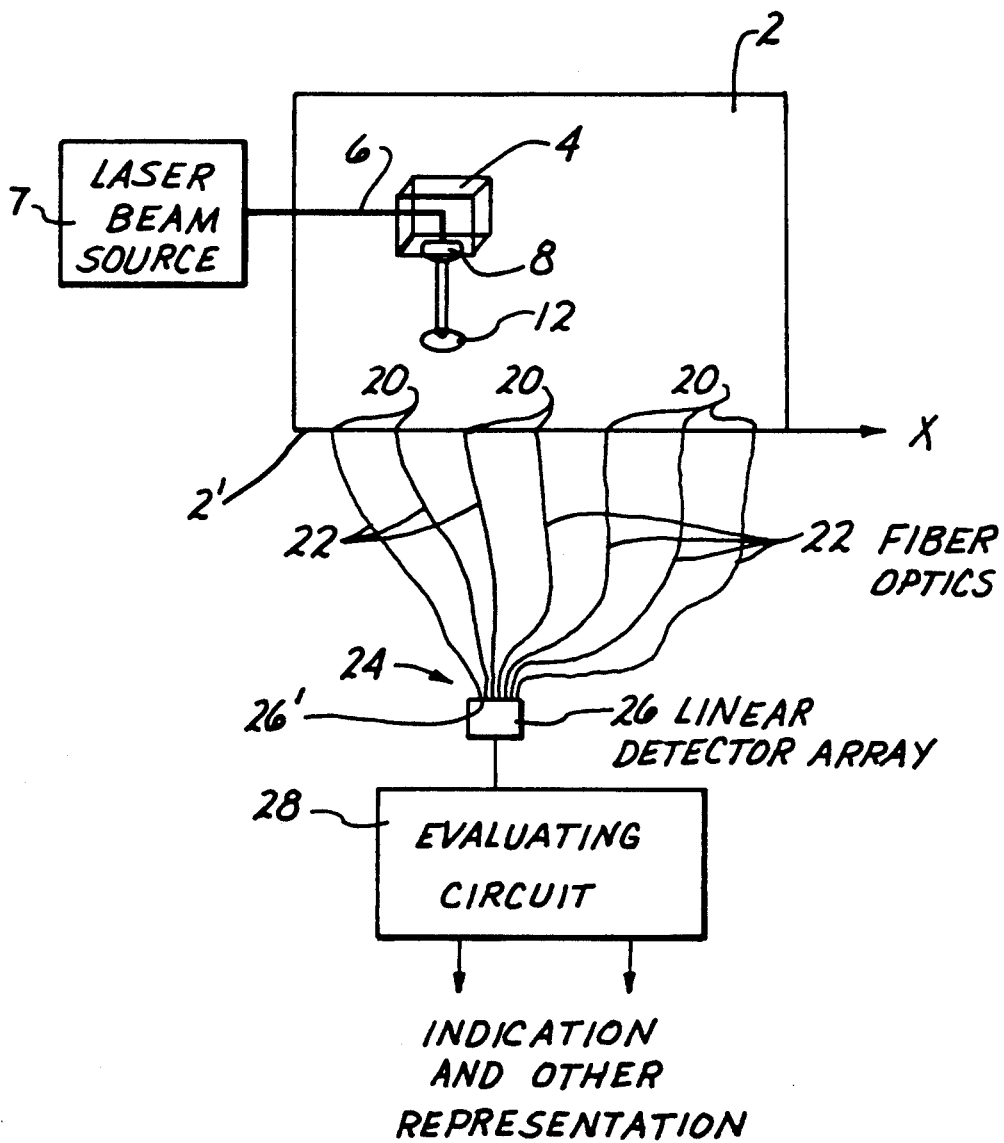
FIG. 1 is a schematic view of a one-dimensional measuring device used in conjunction with a preferred embodiment of the present invention for practicing the best mode thereof in that particular environment.

The radiation emitted by flourescence from that spot 12 runs to the edges or bodies of the flourescent plate or foil 2. A plurality of fiber optics 22 have one respective end each coupled in particular, periodically repeated positions along one of the edges 2', of foil 2. All optical fibers 22 are now run to an edge 26', of a detector 26, which is a one-dimensional position sensitive detector. The edge 26', of that detector 26 where all these fibers 22 end (ends 24), is geometrically similar to, but a scaled down version of the edge 2' along the foil which the entrance points 20 are positioned. The one-dimensional, position sensitive detector 26 (a linear array) provides an electrical output which is received by the evaluating unit 28, in which the position of spot 12 is measured and determined.

The measurement processing simply amounts to comparing the amplitudes of the light at the fiber ends 24 which, of course, varies as far as the inputs to the linear array of inputs 20 of fibers 22 is concerned. The relative amplitudes permit thus detected through natural comparison, the exact determination of the spot 12, of course, in one dimension only, which is the dimension x parallel to the edge along which the inputs 20 are arranged.

Figure 2:
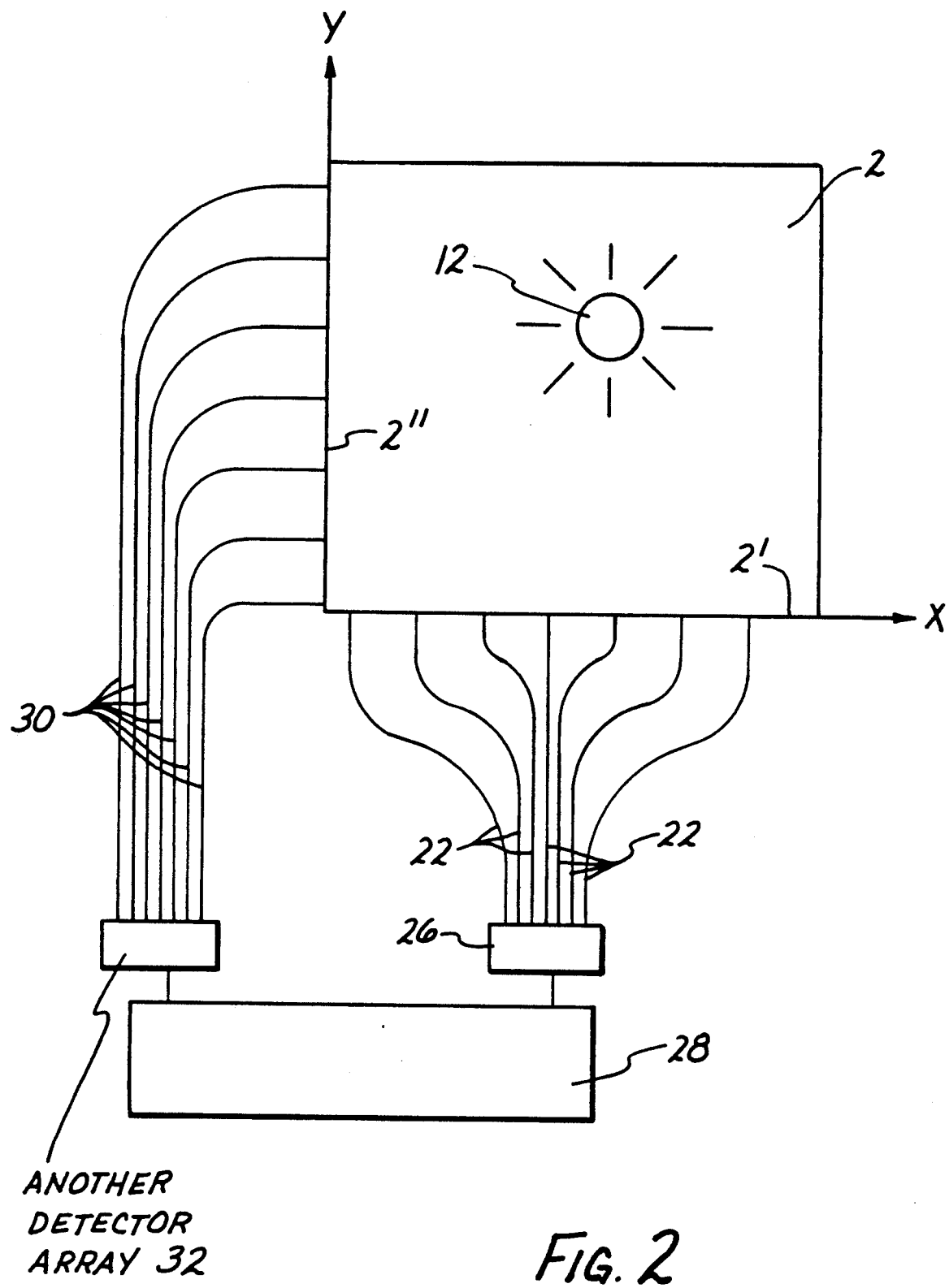
FIG. 2 illustrates a configuration for expanding the configuration shown in FIG. 1 to a two-dimensional measuring arrangement.

Having explained FIG. 1, it is clear that FIG. 2 includes a duplication in the sense that along a second edge 2" of the foil the one end of further fiber optics 30 are arranged, leading to the edge 32 of another detector 32. Detector 32 is quite similar to detector 26, and each of these detectors 26 and 32 provide signals which represent the one coordinate (x and y), so to speak, of the light spot 12 on the foil 2; since there is a definite arrangement owing to the collimation of light between the source and object for the light spots 12, any determination of the position of the latter entails accurate position determination of the former.

Figure 3:
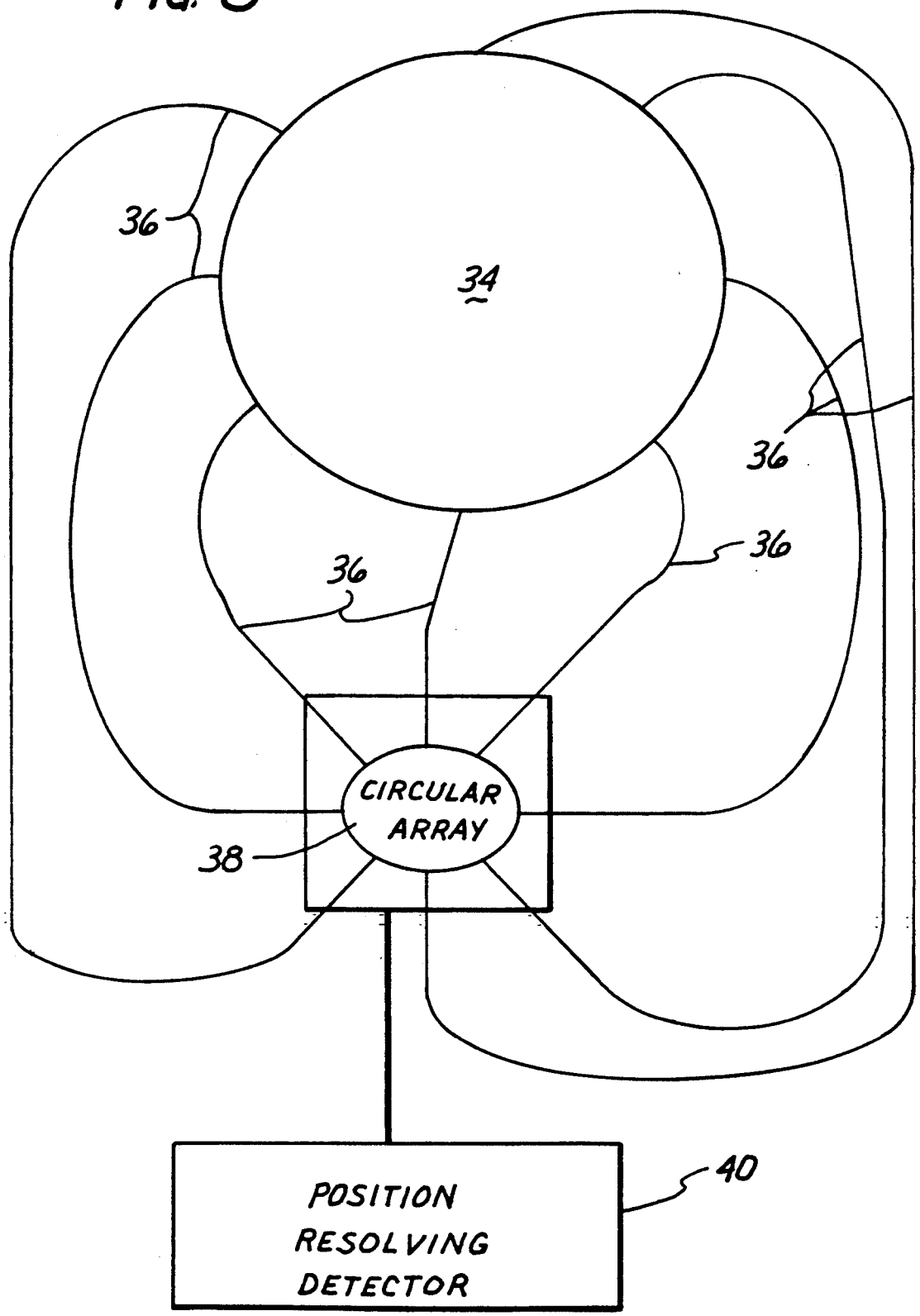
FIG. 3 is a schematic showing of a round measuring foil.

FIG. 3 illustrate schematically the arrangement for determining the position of a light spot within a circular foil 34. The boundary in question is, therefore, a circle, and the ends of optical fibers 36 are arranged periodically in equidistant spaces along the periphery. In this example there are eight fiber optics arranged and they are apart by an angle which is 360° divided by eight, i.e., 45°. The output side of the fiber optics 36 are analogously arranged in a circle 38 along which are arranged the other ends of the fibers 36. That circle 38 of course, is similar to the circle 34 but the smaller diameter. The resulting light distribution is determined through a two-dimensional resolution, position resolving detector 40.

Figure 4:
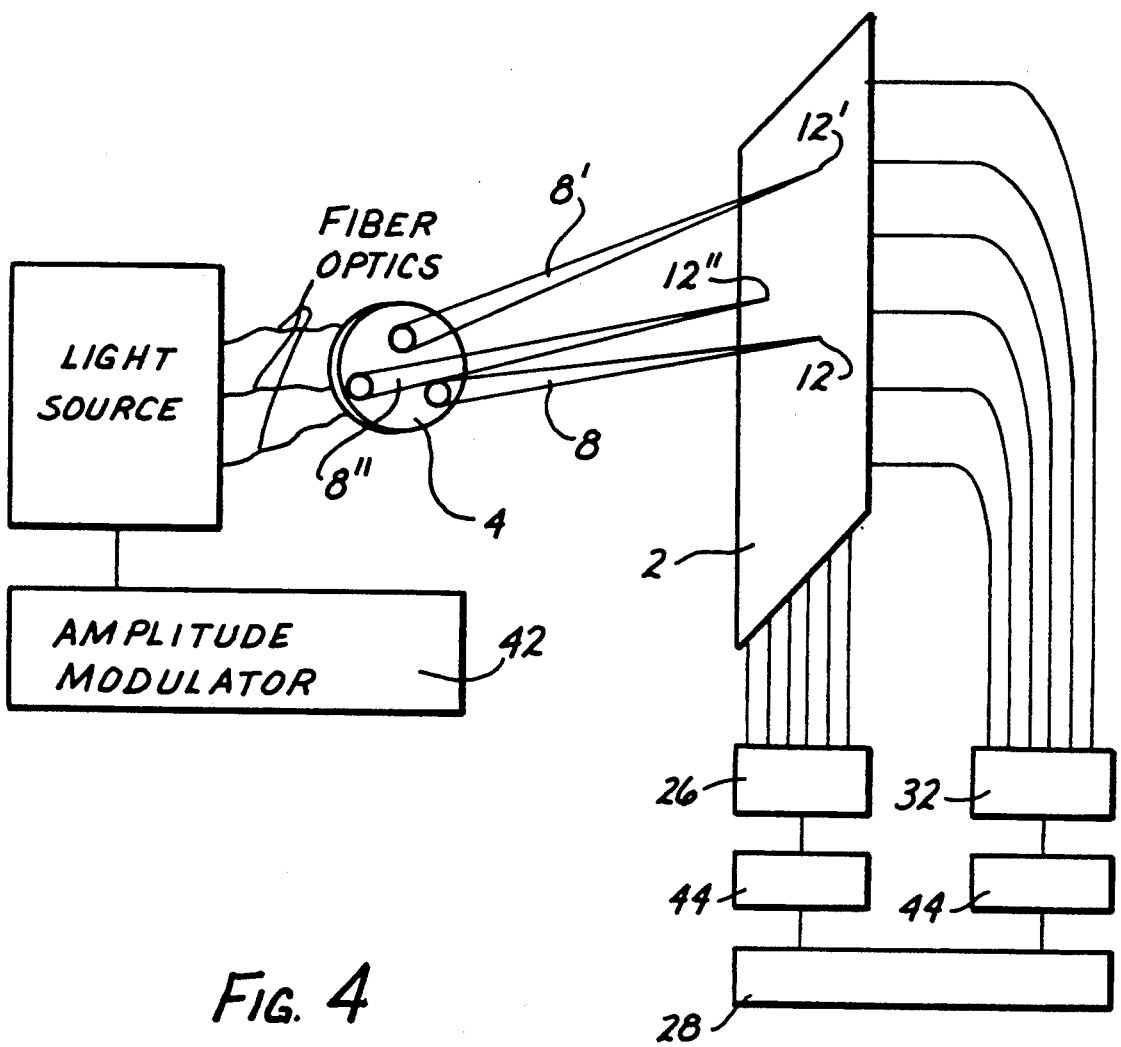
FIG. 4 illustrates the preferred embodiment of practicing the best mode of the invention in a rather sophisticated arrangement for three-dimensional measurement.

Finally, FIG. 4 illustrates how these various aspects can be used to determine the position of an object 4 in three-dimensional space. Here then at least three light conductive optical fibers are fastened to the object 4, the radiation is amplitude modulated and the amplitude modulation is different for each of the three beams 8, 8' and 8". The beams 8, 8' and 8" are arranged at an angle to each other and, in turn, produce light spots 12, 12' and 12" on the flourescent foil 2. The simulating source 7 is equipped with an appropriate amplitude modulator 42 providing the three different modulations, while a position sensitive detector in a two-dimensional array similar to FIG. 2. With 44 indicate two demodulators to separate the three components that are being detected so that with a single array (26) separately three different coordinate points can be determined for one axis, and a second array (32) another three coordinate points can be determined, and on the basis of the amplitude modulation then the three-coordinate value pairs, all together 6 coordinate values, are separately and individually identifiable and there are process in order to determine out of these values, three-dimensional coordinates value for the object 4.

The invention is not limited to the embodiments described above, but all changes and modifications thereof, not constituting departures from the spirit and scope of the invention, are intended to be included.

We claim:

1. Apparatus for determining the position of objects comprising:

light source means positioned in relation to one of said objects such that form a particular position on the one object three collimated beams issue respectively bearing different but fixed and definite positional relationship to the position of said one object, and being differently modulated;

a planar flourescent foil or plate positioned in relation to said one object such that three spots on said foil are stimulated bearing in a two dimensional fashion a very definite position relationship to the position of the one object owing to the utilization of said three collimated beams that provide the stimulations;

a plurality of fiber optics, each having a first and a second end, respective first ends of the respective fiber optics of the plurality of fiber optics being arranged in a spatial relation to said flourescent foil or plate, that establishes and is a particular geometric pattern of positioning, to receive in each instance radiation from such stimulated spots, respective other ends of the fiber optics being arranged in a similar but smaller scale geometric pattern as the first ends are; and detector means in relation to said other ends providing electrical signals that represent the position of said object there being a demodulator included in the detection means in order to differentiate among the different spots, by demodulating in accordance with the different modulations.

2. Apparatus as in claim 1, wherein external source light is applied to that object whose interception results in the light for the collimated beams.

3. Apparatus as in claim 1, wherein a light source is affixed to the object to identify its position and a particular relation in respect thereto.

4. Apparatus as in claim 1, wherein the plural collimating beams run from the object in different directions but all being intercepted by that plate or foil.

* * * * *